(No Model.)

2,931,786
SILOXANE COATING COMPOSITION

Harold A. Clark and John H. Thomas, Midland, Mich., assignors to Dow Corning Corporation, Midland, Mich., a corporation of Michigan No Drawing. Application April 18, 1957
Serial No. 653,523

4 Claims. (Cl. 260—46.5)

This invention relates to siloxane-isocyanate coating compositions.

There has been a long felt need in the paint industry for a coating composition which was air-drying and which could be used as a clear exterior varnish for wood surfaces. Although there are many such varnishes now on the market they suffer from the fact that they weather quite rapidly and in general will last not more than one year before refinishing is needed.

Prior attempts to solve this problem have been made by incorporating organosilicon compounds in alkyd, phenol-formaldehyde and other organic resins. These compositions showed some improvement in weatherability but suffered generally from lack of adhesion to the wood, or from water spotting, or from crazing, or a combination of these. Thus, whereas these organosilicon resins have become quite useful for the coating of metals and interior wood surfaces and for use as outdoor pigmented finishes, there is at the present time no coating material which is satisfactory for use as a clear varnish on outdoor wood surfaces.

It is the object of the present invention to provide novel compositions of matter which are suitable for reaction with isocyanates to give excellent protective coating compositions. Another object is to provide a clear varnish for exterior wood surfaces. Another object is to provide a material suitable for use as pigmented paints. Further objects and advantages will be apparent from the following description.

This invention relates to a composition of matter comprising a copolymer consisting essentially of from 45 to 55 mol percent gamma-hydroxypropylmethylsiloxane, from 35 to 55 mol percent phenylmethylsiloxane and up to 15 mol percent of a siloxane of the formula $RSiO_{1.5}$ where R is selected from the group consisting of methyl and phenyl radicals.

It can be seen that the above copolymers can be copolymers of gamma-hydroxypropylmethylsiloxane and phenylmethylsiloxane or copolymers of these two materials which contain up to 15 mol percent copolymerized monomethyl or monophenylsiloxane or copolymers of gamma-hydroxypropylmethylsiloxane, phenylmethylsiloxane, monomethylsiloxane and monophenylsiloxane, the latter two totaling up to 15 mol percent. It has been found that when the proportions of the various siloxanes are outside the above limits inferior products are obtained.

It has also been found that the best coating compositions are those which consist essentially of from 45 to 55 mol percent gamma-hydroxypropylmethylsiloxane, from 35 to 50 mol percent phenylmethylsiloxane and from 1 to 15 mol percent monomethylsiloxane. These copolymers are much superior to the others within the scope of this invention.

The term "consisting essentially of" as used in the specification and claims means that the siloxane units in the copolymers are essentially as defined but the copolymers may contain incidental amounts of other siloxane units which are normal commercial impurities in such siloxanes.

The copolymers of this invention are best prepared in accordance with the method set forth in the copending application of John L. Speier, Serial No. 488,163, filed February 14, 1955, although the copolymers can also be prepared by any of the commonly known methods for cohydrolyzing chlorosilanes or for catalytically copolymerizing siloxanes.

The compositions of this invention are formed into cured resins by mixing them with any di- or polyisocyanate and allowing the mixture to cure. If desired, the curing may be hastened by applying heat although this is not essential. Also, if desired, the curing can be hastened by including catalysts such as methyl morpholine.

For the purpose of this invention any isocyanate having two or more isocyanate radicals in the molecule can be employed to form the coating compositions of this invention. Specific examples of such isocyanates are aliphatic diisocyanates such as hexamethylene diisocyanate or aromatic diisocyanates such as meta-toluene diisocyanate, p,p'-diphenylmethane diisocyanate, 3,3'-dimethyl-4,4'-biphenylene diisocyanate, 3,3'-dimethoxy-4,4'-biphenylene diisocyanate and 3,3'-dichloro-4,4'-biphenylene diisocyanate.

In general, the siloxanes of this invention are mixed with the isocyanate in such proportion to give the optimum cure and the mixture is then applied to the surface and allowed to cure. The precise amount of the isocyanate needed to give the best properties varies depending upon the formulation of the siloxane copolymer. In general, it has been found that satisfactory films are obtained when the isocyanate is employed in amount of from 10 to 40% by weight based on the weight of the siloxane copolymer although greater or lesser amounts of isocyanate can be used as desired.

When the siloxane copolymers of this invention are fluid they may be mixed with the isocyanate and applied to the surface per se. However, under such conditions the shelf life of the mixture is rather short so it is often desirable to dilute the siloxane-isocyanate mixture with a solvent such as toluene, xylene, petroleum ether or the like. The shelf life of the solution is much longer than that of the solvent-free mix so that much longer working time can be obtained.

The coating compositions of this invention can contain any type of pigment, dye or other coloring material. They can also contain other additives to improve flow-out, oxidation resistance, or other properties of the films.

The compositions of this invention can be applied to the surface in any desired manner such as by brushing, dipping or spraying and they will generally cure to a tack-free state at room temperature in 24 hours or less. The compositions are also applicable to any type of surfaces such as wood, metal, ceramic, or organic plastics. If desired, the curing of the resin can be hastened by heating the coated article after application of the composition. Under such conditions cures may be obtained in a matter of a few minutes.

The cured compositions of this invention produce films having a high gloss and they maintain this gloss after prolonged exposure to weather. To applicants' knowledge these compositions are superior in this respect to any other known air-drying organic or organosilicon coating composition.

The following examples are illustrative only and should not be construed as limiting the invention which is properly set forth in the appended claims. All of the gloss readings shown below were determined on a Gardner portable 60° glossmeter.

Example 1

A mixture of 860 g. (50 mol percent) of gamma-acetoxypropylmethyldichlorosilane, 611 g. (40 mol percent) phenylmethyldichlorosilane and 169 g. (10 mol percent) phenyltrichlorosilane in 1762 g. of toluene was hydrolyzed at a temperature of 50 to 60° C. The corresponding cohydrolyzate was washed to neutrality and the resulting copolymer was saponified by mixing it with 750 cc. of ethanol, 150 cc. of water and 85 g. of sodium hydroxide and then refluxing the mixture for 2 hours. The water layer was then separated and the siloxane layer was washed twice with 2% hydrochloric acid. The solvent was then removed to give a copolymer of 50 mol percent gamma-hydroxypropylmethylsiloxane, 40 mol percent phenylmethylsiloxane and 10 mol percent monophenylsiloxane.

35 parts by weight of the above copolymer were mixed with 15 parts by weight toluene and 7.6 parts by weight of toluene diisocyanate. Metal panels were dipped into the solution and after removal they dried to a tack-free state in about 2 hours to give a coating having a high gloss.

A sample of the above resin was diluted to 40% solids in toluene and was then coated on wooden panels. After drying, the coated samples were aged 1,000 hours in a weatherometer and the final gloss was 65.

Example 2

Using the procedure of Example 1 a copolymer of 50 mol percent gamma-hydroxypropylmethylsiloxane and 50 mol percent phenylmethylsiloxane was prepared. 10 parts by weight of this copolymer were mixed with 1.53 parts by weight of toluene diisocyanate. The resulting material was coated on a wood panel and allowed to air-dry. The wood panel was exposed for 1009 hours in a weatherometer. The resulting film had a gloss of 56.

Example 3

Using the procedure of Example 1 a copolymer of 50 mol percent gamma-hydroxypropylmethylsiloxane, 40 mol percent phenylmethylsiloxane and 10 mol percent monomethylsiloxane was prepared.

25 parts by weight of this copolymer were mixed with 7.67 parts by weight toluene diisocyanate and 25 parts by weight toluene. The resulting solution was sprayed on a cedar panel and allowed to air-dry. The resulting coating was hard and glossy and had an initial gloss of 88. After 1000 hours in a weatherometer the gloss was 75. After 2000 hours in the weatherometer the gloss was still 75.

Another cedar panel coated with this material shows excellent gloss and appearance after six months' exposure to the sun in Florida.

Example 4

Employing the procedure of Example 1 a copolymer of 50 mol percent gamma-hydroxypropylmethylsiloxane, 45 mol percent phenylmethylsiloxane and 5 mol percent monomethylsiloxane was prepared.

10 parts by weight of this copolymer were mixed with 1 part by weight xylene, 1 part by weight ethylacetate, .01 part by weight methyl morpholine and 2.5 parts by weight toluene diisocyanate. The resulting composition was coated on cedar panels and after 895 hours in an Atlas Weatherometer the gloss was 80.

The resin was also applied to aluminum panels and the gloss is still essentially unimpaired after 1200 hours in the Atlas Weatherometer.

That which is claimed is:

1. A composition of matter comprising a copolymer consisting essentially of from 45 to 55 mol percent gammahydroxypropylmethylsiloxane, from 35 to 55 mol percent phenylmethylsiloxane and up to 15 mol percent of a siloxane of the formula $RSiO_{1.5}$ where R is selected from the group consisting of methyl and phenyl radicals.

2. A cured, resinous material comprising the reaction product of the composition of claim 1 and an organic isocyanate selected from the group consisting of hydrocarbon isocyanates and halogenohydrocarbon isocyanates and having at least two isocyanate groups in the molecule.

3. A composition of matter comprising a copolymer consisting essentially of from 45 to 55 mol percent gamma-hydroxypropylmethylsiloxane, from 35 to 50 mol percent phenylmethylsiloxane and from 1 to 15 mol percent monomethylsiloxane.

4. A cured, resinous material comprising the reaction product of the composition of claim 3 and an organic isocyanate selected from the group consisting of hydrocarbon isocyanates and halogenohydrocarbon isocyanates and having at least two isocyanate radicals in the molecule.

References Cited in the file of this patent

UNITED STATES PATENTS

| | | |
|---|---|---|
| 2,443,898 | Ellingboe | June 22, 1948 |
| 2,527,590 | Speier | Oct. 31, 1950 |
| 2,527,591 | Speier | Oct. 31, 1950 |
| 2,629,727 | Speier | Feb. 24, 1953 |

OTHER REFERENCES

Speier: J.A.C.S., volume 74, Number 4, pages 1003–1010, February 20, 1952. (Copy in Science Library.)